United States Patent [19]
Lowrance

[11] 4,069,960
[45] Jan. 24, 1978

[54] APPARATUS FOR INSERTING STICKS INTO ARTICLES

[76] Inventor: Thomas F. Lowrance, 3601 Security St., Garland, Tex. 75040

[21] Appl. No.: 748,169

[22] Filed: Dec. 7, 1976

[51] Int. Cl.² .............................................. B27F 7/00
[52] U.S. Cl. .................................... 227/120; 227/139
[58] Field of Search ...................... 227/21, 26, 27, 120, 227/130, 139; 221/131, 232

[56] References Cited

U.S. PATENT DOCUMENTS

| | | | |
|---|---|---|---|
| 2,681,842 | 6/1954 | Rabkin et al. | 221/131 X |
| 2,959,786 | 11/1960 | Peterssen | 227/130 X |
| 3,108,713 | 10/1963 | Fazekas | 221/131 X |
| 3,316,010 | 4/1967 | Lowrance | 144/60 X |
| 3,691,608 | 9/1972 | Lowrance | 227/139 |

Primary Examiner—Granville Y. Custer, Jr.
Attorney, Agent, or Firm—Peter J. Murphy

[57] ABSTRACT

For inserting sticks into wieners or other articles, the apparatus includes: a wiener holder having an array of side-by-side wiener chambers; a stick box including an array of side-by-side feed grooves aligned with the wiener chambers; a push rod assembly including an array of side-by-side push rods for pushing the sticks from the feed grooves into the wiener chambers; and a power mechanism for reciprocating the push rod assembly. The stick box includes means for supporting and guiding respective stacks of sticks for each feed groove. The feed grooves are T-shaped in cross-section having a bar portion for accommodating flat sticks in free sliding relation; and the grooves accommodating push rods having a corresponding T-shaped cross-section for free sliding, reciprocating movement in the feed grooves. The push rods are held in a push bar with a clearance fit for self-guidance through these grooves. The push bar is reciprocated by double acting air cylinders on guide shafts, and includes coacting linear ball bearings. The longitudinal axes of the wiener chambers, the feed grooves, the push rods, and push bar guide shafts are carefully aligned in a common plane. The apparatus will handle round sticks also.

14 Claims, 13 Drawing Figures

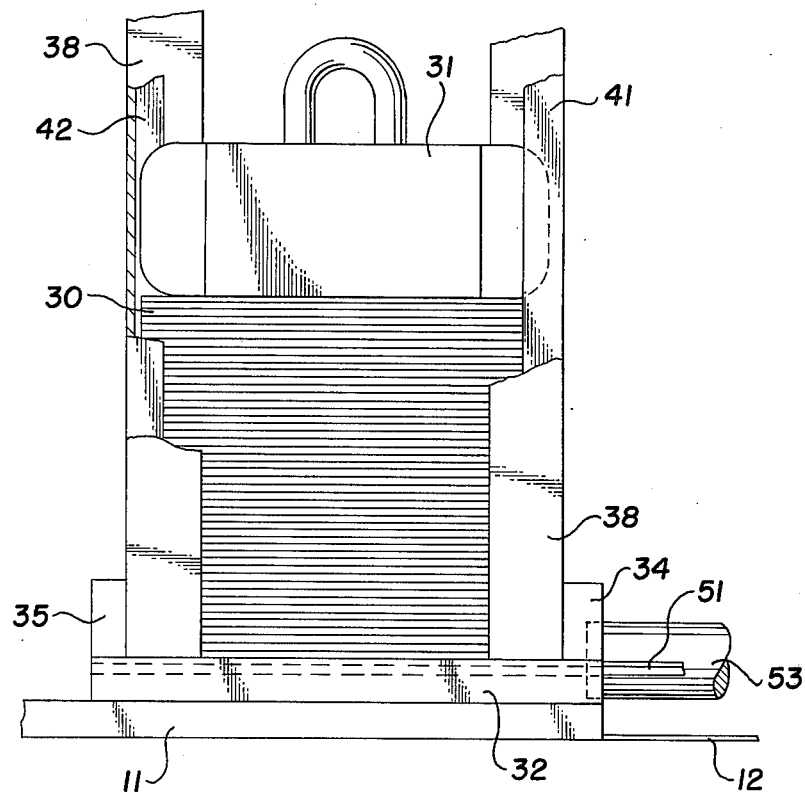
Fig. 7
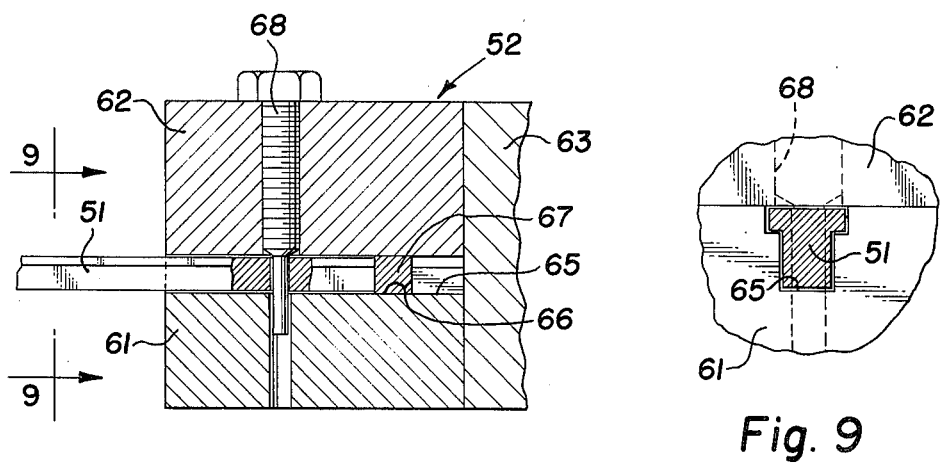
Fig. 8
Fig. 9

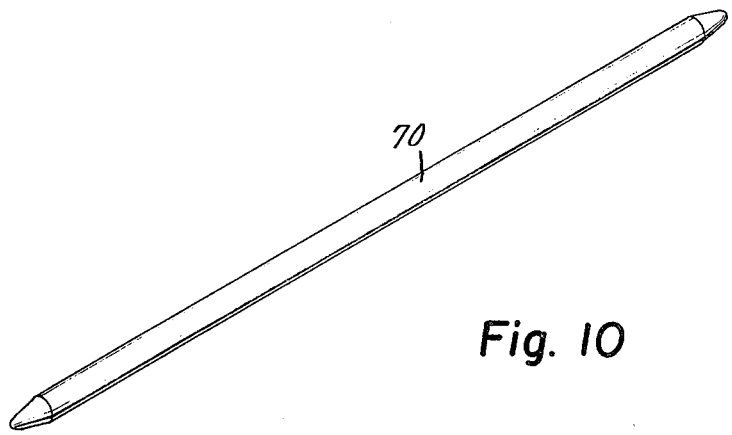
Fig. 10
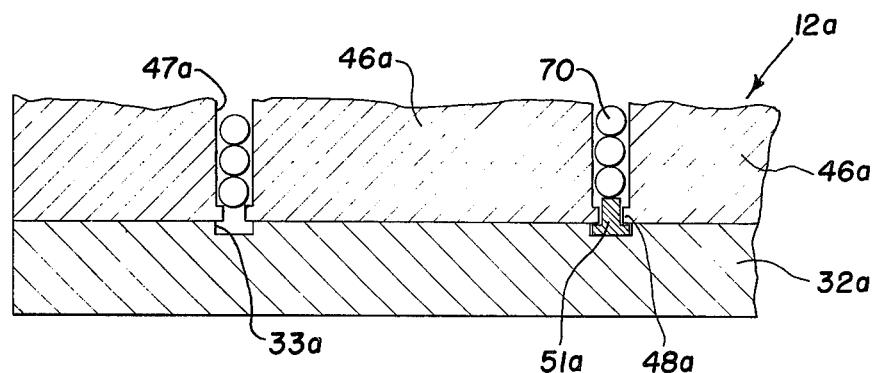
Fig. 11
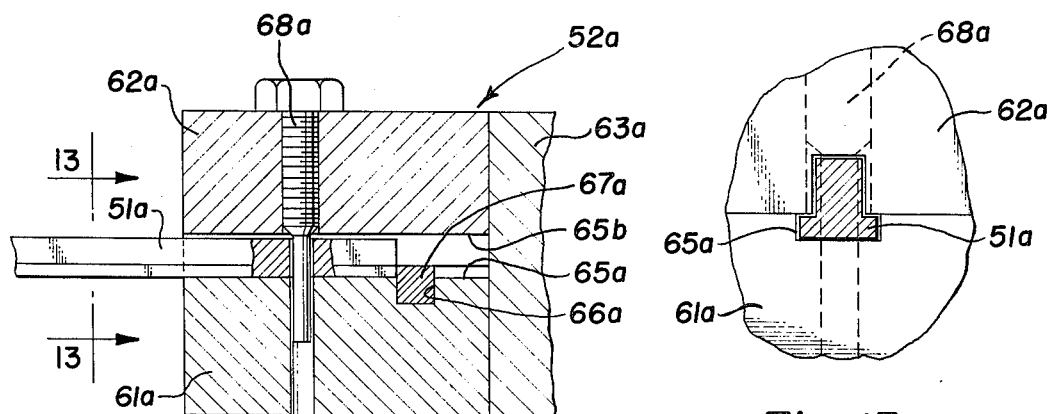
Fig. 12
Fig. 13

APPARATUS FOR INSERTING STICKS INTO ARTICLES

BACKGROUND AND SUMMARY OF THE INVENTION

This invention relates to a semi-automatic apparatus for inserting holder sticks into food articles such as wieners, or into other articles. The apparatus of this invention is similar in general arrangement and purpose to apparatus described in applicant's U.S. Pat. No. 3,691,608, issued Sept. 19, 1972, that apparatus particularly designed for inserting round holder sticks into wieners.

The invention is particularly concerned with the manufacture or processing of a food product known as "corny dogs" which are made from wieners having a holder stick inserted into one end and which are coated with a cornmeal batter, for example, for ultimate frying in deep fat at the point of use.

A principal object of this invention is to provide improved apparatus for inserting sticks into articles, which apparatus is reliable and durable, and subject to minimum down time for adjustment or for correcting malfunctions.

Another object of this invention is to provide such apparatus which is efficient and easy to use;

A further and more particular object of this invention is to provide such apparatus including means for the uniform and reliable guiding of the sticks into appropriate feed grooves for insertion into the articles.

Still another object of this invention is to provide such apparatus having a unique relationship of stick feed grooves and push rods assembly for reliable feeding of the sticks.

These objects are accomplished, broadly, in apparatus which includes an article holder having a plurality of chambers, each dimensioned to receive a single article; with the chambers being disposed in side-by-side relation. The stick box includes means defining the same plurality of stick feed grooves at the base thereof, disposed in parallel side-by-side relation and in longitudinal alignment with respective article chambers. The stick box includes means for supporting a stack of sticks overlying each feed groove. A push rod assembly includes a push bar and the same plurality of elongated push rods, which are supported by the push bar in parallel side-by-side relation and in alignment with respective feed grooves. Means is provided for reciprocating the push rod assembly, to reciprocate the push rods in the feed grooves. The feed grooves each include a T-shaped cross-section including a bar portion and a stem portion. The push rods each have a T-shaped cross-section including a bar portion and a stem portion, and are dimensioned to be fully received in the feed grooves with a free sliding clearance fit.

More particularly the stick box includes individual channel means overlying each feed groove for guiding stacks of sticks into the respective feed grooves; and individual weight means are provided for urging each stack toward its respective groove. The push bar includes means for holding the push rods with a clearance fit to allow the rods to be self-aligning in the respective feed grooves.

The novel features and the advantages of the invention, as well as additional objects thereof, will be understood more fully from the following description when read in connection with the accompanying drawings.

DRAWINGS

FIG. 7 is a fragmentary end view of the stick box;

FIG. 8 is a partial transverse sectional view of the push bar, taken in the plane 8—8 of FIG. 2;

FIG. 9 is a fragmentary view of the push bar, taken in the plane 9—9 of FIG. 8;

FIG. 10 is a perspective view of a round stick which is handled by the apparatus of the invention;

FIG. 11 is a fragmentary sectional view, which corresponds generally to FIG. 6, of an alternative form of stick hopper for handling round sticks as illustrated in FIG. 10; and FIGS. 12 and 13 are fragmentary views which correspond respectively to FIGS. 8 and 9 and illustrate modifications of the apparatus rod assembly push bar for the handling of round sticks illustrated in FIG. 10.

DESCRIPTION OF THE PREFERRED EMBODIMENTS

Figure 1:
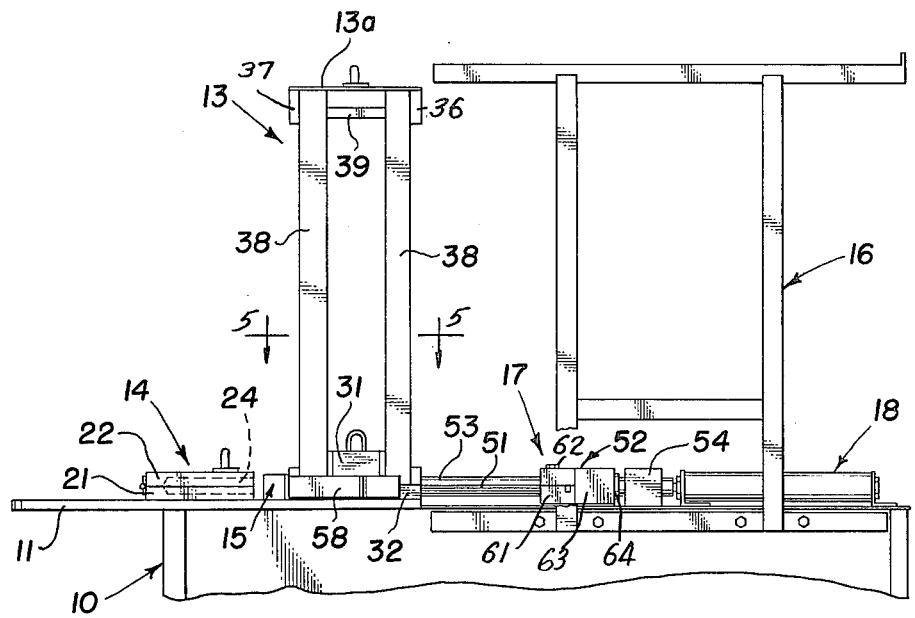
FIG. 1 is a side view of one form of apparatus according to the invention.
Figure 2:
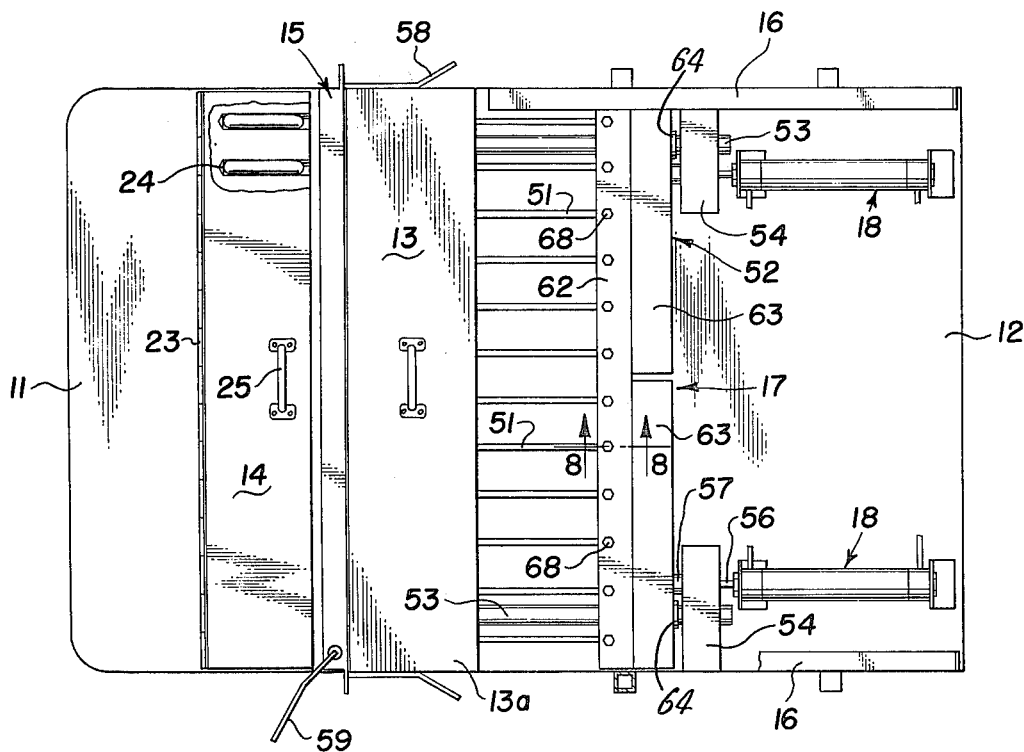
FIG. 2 is a top view of the apparatus of FIG. 1.
Figure 3:
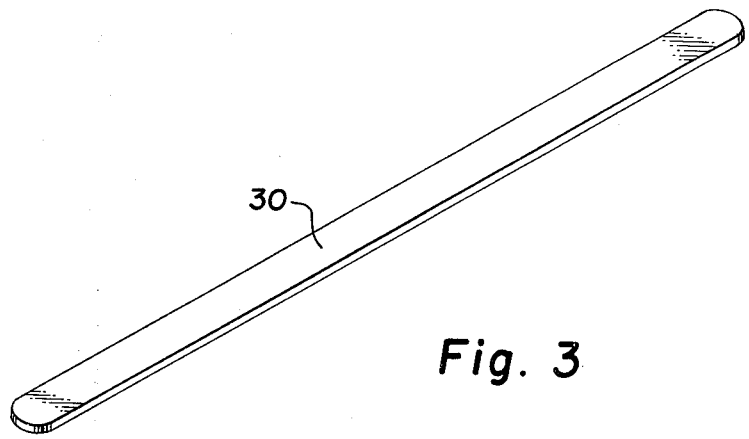
FIG. 3 is a perspective view of a flat stick which is handled by the apparatus of the invention.
Figure 4:
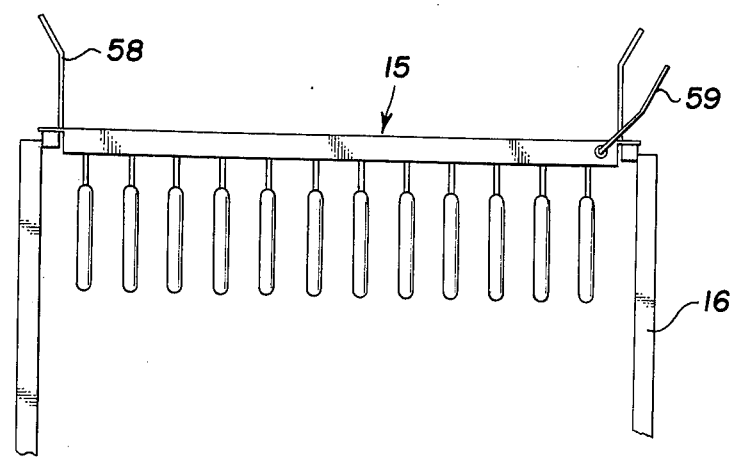
FIG. 4 is a fragmentary end view of the apparatus, illustrating a stick holder bar and wieners on the supporting rack.

The overall structural arrangement of one form of apparatus, particularly designed for inserting flat sticks into wieners, is illustrated in FIGS. 1, 2 and 4. The apparatus includes a support frame 10 for supporting the apparatus on a floor surface, and providing an elevated support surface defined in part by a mounting plate 11 at the front portion of the frame and a cover plate 12 covering the rear portion of the frame. Mounted on the mounting plate are a stick box 13 for containing a supply of sticks used by the apparatus, and a wiener holder 14 disposed at the front of the apparatus. A stick holder bar 15 is an accessory disposed between the stick box and wiener holder, for gripping a plurality of wieners with sticks inserted. The holder bar is used for temporary storage of the wieners on a rack 16 as seen in FIG. 4, and for subsequent processing of the wieners. A push rod assembly 17 and associated power cylinders 18 may be enclosed with a suitable cover (not shown). The stick box 13 is closed with a suitable cover 13a. A stick 30 of the type handled by this machine is illustrated in FIG. 3, and is a flat stick with rounded ends having a rectangular cross-section. The stick dimensions may be 5.5 × .25 × .08 inch, for example.

Referring to the structure in somewhat more detail, the wiener holder 14 consists of bottom and top plates 21 and 22 hinged by a suitable hinge 23 at the front edge. The plates define a horizontal parting plane for twelve spaced, parallel, elongated wiener chambers 24 which open to the rear edge of the holder. A handle 25 is mounted on the top plate to raise this plate.

The stick box 13 includes an elongated base plate 32 having twelve, upward opening, transverse side-by-side feed grooves 33 which are aligned with the wiener chambers. A support frame overlies each groove to support a stack of sticks 30; and a weight 31 also supported in the support frame urges the stack toward the feed groove.

The push rod assembly 17 consists of twelve parallel push rods 51 carried by a push bar subassembly 52 and guided in the stick box feed grooves. The push bar 52, an assembly to be described, is guided for reciprocating movement on guide shafts 53, supported at their rearward ends in mounting blocks 54 and supported at their forward ends in suitable recess bores in the stick box. The push bar includes linear ball bearings 64 for very smooth movement of the push bar along the guide shafts. The forward ends of the push rods are supported and guided in the stick box and will be described.

The power cylinders 18 are preferably a pair of double acting air cylinders supported on the frame 10 by suitable brackets, and having their plunger shafts 56 extending through suitable holes in the mounting blocks and secured to the push bar 52 by means of suitable brackets 57. The power cylinders would preferably be controlled by a suitable foot actuated four-way control valve (not shown) mounted at the lower portion of the frame 10.

The stick holder bar 15 may be similar to that described in applicant's above mentioned U.S. Pat. No. 3,691,608; and the operation of the stick holder bar in relation to the associated apparatus is also described in that patent. A stick holder bar is also described in applicant's prior U.S. Pat. No. 3,316,010 issued Apr. 25, 1967. In general, the stick holder bar is an elongated bar having guide brackets 58 for positioning and aligning the bar in relation to the stick box 13. The sticks, when projected from the stick box into the wieners, pass through openings in the stick holder bar 15 with the rearward ends being disposed within the bar at the end of the insertion operation. The sticks are then clamped in the bar, by an internal clamping mechanism, actuated by lever 59, so that the assembly of twelve wieners and sticks may be processed further as a unit.

Figure 5:
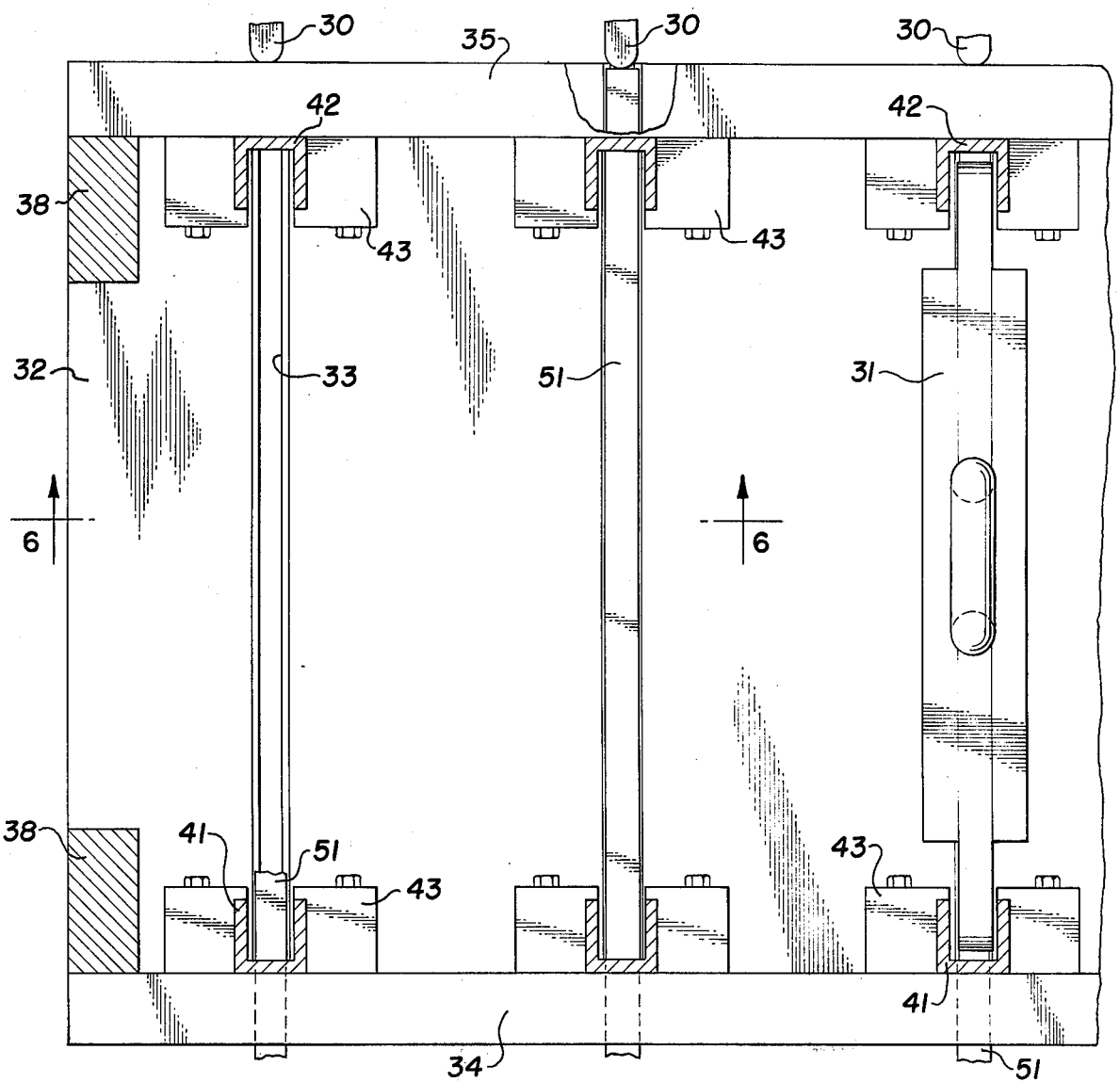
FIG. 5 is a fragmentary view of the stick box, taken in the plane 5—5 of FIG. 1.
Figure 6:
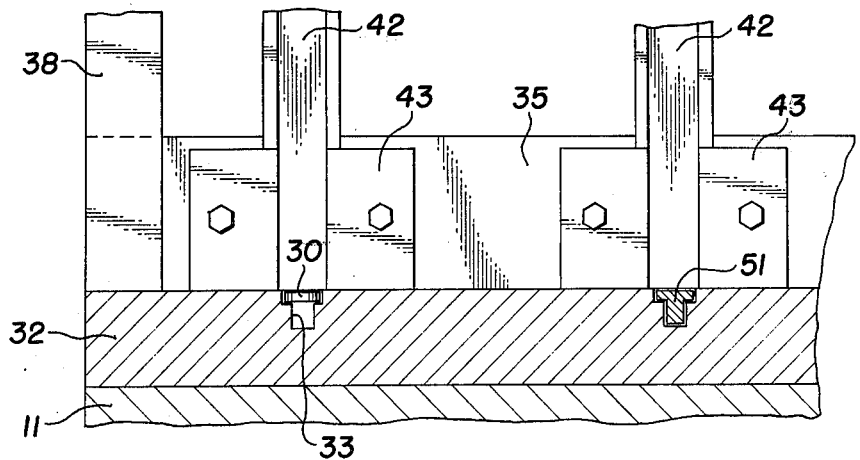
FIG. 6 is a fragmentary sectional view of the stick box, taken in the plane 6—6 of FIG. 5.

Referring now to detailed structure, the stick box 13 is particularly illustrated in FIGS. 5,6 and 7. The stick box includes the base plate 32, secured to the mounting plate 11, which has twelve feed grooves 33 opening to its top face and which are spaced to correspond to the spacing of the wiener chambers 24. As illustrated, the top face of the base plate 32 is planar; and the grooves have a cross-section, best illustrated in FIG. 6, which is T-shaped including a bar portion adjacent to the plate surface and a dependent stem portion. In cross-section, these grooves are dimensioned so that the bar portion fully receives and supports one stick 30 with sufficient clearance that the stick may slide freely along the groove 32, and so that the grooves fully receive the push rods 51 as will be described. A rear bottom or proximal bar 34 and a front bottom or proximal bar 35 are mounted respectively at the rear and front edges of the base plate overlying the feed grooves; and these bars serve to limit any upward movement of the push rods 51 or the sticks 30 as they move through the feed grooves 33. A rear top or distal bar 36 and a front top or distal bar 37 are supported above the respective rear and front bottom bars by vertical bars 38; and the top bars are maintained in spaced relation by several spacer rods 39. The bottom bars and top bars define support bars for a plurality of rear and front U-shaped channel members 41 and 42 respectively which are secured to the respective support bars by means of clamps 43. The channel members are mounted on the confronting faces of the rear and front support bars and disposed with the channels of the channel members confronting each other to define the support frames for the sticks 30. The clamps 43 engage the side edges of the channel members 41 and 42 so that these members define clear and unobstructed guide channels for the movement of the sticks toward the guide grooves.

As seen the width of the channels is approximately the same as the width of the feed groove bar portions; and the channels are arranged to confine the ends of the sticks 30 and guide them directly into the feed grooves. The weights 31 are dimensioned to be guided also in the support frame defined by confronting channel members 41 and 42; and the central portions of the weights have an enlarged transverse dimension so that they will not move into the feed grooves. The lower surfaces of the weights are generally planar to urge the last stick into the guide groove, but to not interfere with the operation of the push rod when no sticks are in the particular support frame. The sticks and weights are conveniently loaded into the several support frames from the top of the stick box. In a finished machine the stick box would be substantially fully enclosed with a protective cover; and a hinged top cover 13a enables the reloading of the stick box.

The push rod assembly 17 includes the push bar subassembly 52 best seen in FIGS. 2, 8 and 9. The push bar subassembly includes an elongated holder bar 61 and an overlying clamp bar 62 secured to two contiguous back bars 63. Linear ball bearings 64 are carried in the respective back bars 63 for guiding the push bar assembly very precisely and smoothly on the guide shafts 53.

The holder bar 61 has a planar top face provided with a plurality of longitudinally spaced, upward opening holder grooves 65 which are T-shaped in cross-section, having an upper bar portion and dependent stem portion in the same configuration as the stick box feed grooves 33. The push rods 51 having a corresponding T-shaped cross-section; and are dimensioned relative to the holder grooves and the guide grooves to be fully received within these grooves with a clearance fit allowing for both lateral and vertical movement of the push rods within the confines of the respective grooves. These clearances may be in the range of 0.010 to 0.020 inches for example. The holder bar is also provided with a longitudinal groove 66 adjacent to its rear edge, which groove intersects the holder grooves 65. A bearing bar 67 is received in the groove 66 and defines a rear wall against which the push rods abut during the forward movement of the push rod assembly. This bearing bar 67 may be of a hardened material such as stainless steel key stock, in relation to a softer metal such as aluminum for the holder bar 61 and clamp bar 62.

The push rods 51 are retained within the holder grooves 65 by means of retainer pins 68, each including a larger threaded portion threaded into threaded bores in the clamp bar 62, and a projecting reduced diameter pin portion which passes through suitable holes in the push rods and in the holder bar. A clearance fit is provided between the retainer pin and the push rod hole, to assure that the stick inserting force is applied to the push rod by means of the bearing bar 67 rather than by means of the retainer pin. The push rods are moved rearward by means of the retainer pins. In the retracted position of the push rod assembly, the forward ends of the push rods are positioned in the feed grooves underlying the rear support bar 34. The horizontal and vertical clearances between the push rods and feed grooves may also be in the range of .010 to .020 inches, for example.

The apparatus is designed to assure that there will be no binding of parts as the push rod assembly is moved forward to project the sticks 30 from the feed grooves into the wieners. For this purpose the longitudinal alignment of the wiener chambers 24 the stick feed grooves 33 and the push rods 51 is as near perfect as possible. Also, the guide shafts 53 are prefectly parallel with alignment, as are the air cylinders 18. The mounting of the push bar on the guide shafts by means of the linear ball bearings 64 assures very smooth and precise reciprocating movement of the push bar; and further, the use of a pair of air cylinders 18 driven of course from a common source of pressure, assures uniform application of force to the push bar.

Of particular importance, for the purpose of preventing any binding of the push rods within the feed grooves, are the manner of mounting the push rods in the push bar and the designed clearances between the push rods and the feed grooves. Also important is the cross-sectional configuration of the push rods which minimizes flexure of the rods either laterally or vertically as a result of longitudinally applied force. As described above, the push rods are loosely held in the push bar, to allow the push rods to be self-aligning in their movement through the feed grooves in the event of slight misalignment. The designed clearance between the push rods and the feed grooves also allows this self-alignment process. Any tendency of the push rods to move upward relative to the feed grooves is prevented by the rear support bar 34; and, similarly any tendency of the sticks 30 to move upward is prevented by the overlying support bar 35. Should sticks 30 become splintered or cocked in the feed grooves, such sticks and splinters will be readily ejected from the stick box by the push rods, obviating any necessity to stop the apparatus and clear the grooves and thereby minimizing down time.

To further minimize the possibility of any binding of parts and to assure smooth and true insertion of the sticks, the following center lines are arranged to lie as closely as possible in a common plane; the longitudinal center lines of the wiener chambers 24; the longitudinal center lines of the feed grooves, and accordingly of the sticks 30 supported therein; the longitudinal center lines of the push rods 51; the longitudinal center lines of the push bar guide shafts 53; and the longitudinal center lines of the power cylinders 18.

EMBODIMENT OF FIGS. 11 THROUGH 13

The apparatus as above described may be readily modified to handle round sticks 70, illustrated in FIG. 10, as well as flat sticks. The round sticks 70, by way of example, may have a length of 5.5 inches and an outer diameter of 3/16 inch, with at least one end having a form of conical point.

For the handling of round sticks, a different type of stick box or stick hopper would preferably be employed. A stick hopper for handling round sticks is described in detail in the applicant's above mentioned U.S. Pat. No. 3,691,608; and the description relating to the stick hopper 12 in that patent is incorporated herein by reference. As described in that patent (see FIG. 7) the hopper 12 includes a bottom plate 38 having means defining stick feed chambers or grooves 45, and dividers 46 in the stick hopper define vertical slots or channels for guiding a stack of sticks into each groove 45. FIG. 11 of the drawing is a fragmentary sectional view of the type of hopper as illustrated in FIG. 7 of U.S. Pat. No. 3,691,608, modified for use in the apparatus described here, and corresponds generally to the view illustrated in FIG. 6 with respect to the previously described apparatus. Referring to FIG. 11, the stick box or stick hopper 12a includes a base plate 32a and plurality of dividers 46a which define guide channels 47a for guiding a single stack of round sticks into each feed groove. In this embodiment, the stick feed grooves are actually defined by the channels 47a and confronting lips 48a at the bottoms of the channels which prevent the sticks 70 from moving to the base plate 32a. Grooves for receiving and guiding the push rods 51a are defined in part by a shallow groove 33a formed in the upper surface of the base plate 32a and by the spaced, confronting lips 48a of the dividers 46a. As seen in FIG. 11, the T-shaped push rods 51a are inverted from the position illustrated in FIG. 6, with the push rod bar portion being received and confined in the groove 33a and with the stem portion extending upward between the lips 47a and beyond the upper surfaces thereof. When a push rod 51a is moved to feed a stick 70 into a wiener, the upper extremity of the push rod stem portion will engage one end of a stick 70 then resting on lips 48a.

To support the inverted push rods 51a, a slight modification is required in the push bar 52a; and this is illustrated in FIGS. 12 and 13. As seen, each push rod 51a is confined in a groove defined in part by groove 65a in the holder bar 61a and a groove 65b in the clamp bar 62a. The retaining pins 38a are correspondingly shorter. In other respects the parts of the push bar assembly 52a are identical to the described push bar 52, with the corresponding parts being identified by the same reference numbers with the subscript "a".

It will be seen, then, that apparatus according to the invention may be adapted to handle flat sticks, 30, round sticks 70, or sticks of other configuration.

OPERATION

The operation of the apparatus will be outlined briefly. Wieners are inserted into the wiener chambers 24 manually. A stick holder bar 15 is placed in appropriate position adjacent to the stick box and conditioned to permit pass through of the sticks. The push rod assembly 17 is in the illustrated retracted position, effected by the normal condition of a foot control valve. The operator then actuates the foot control valve to effect forward movement of the push rod assembly thereby pushing the sticks forward through the stick holder bar and into the wieners held in the wiener chambers, with the sticks being fully ejected from the stick box and the rearward ends being confined in the stick holder bar. Release of the control valve effects return movement of the push bar assembly to the fully retracted position. The control lever of the stick holder bar 15 is then actuated to clamp the sticks in the bar, the wiener holder top plate 22 is raised; and the bar 15 and assembled sticks and wieners placed on the rack 16. The cycle is then repeated.

FEATURES AND ADVANTAGES

What has been described in apparatus for inserting sticks into articles such as wieners, the apparatus having a number of features to make it durable and reliable and to minimize malfunctions resulting in expensive down time. The apparatus will handle flat sticks, round sticks, or sticks having other configurations.

An important structural feature is that the push rod assembly guide bar is carried on guide shafts by means of linear ball bearings, to assure smooth and precise rectilinear movement and thereby minimize any cocking of the push bar which would encourage binding.

Also of importance to minimize binding is that the center lines of all parts which have a part in the transmission of longitudinal force are aligned in a common plane. There is no unbalance force to cause any part to move upward or downward from the intended linear track.

A particularly important feature, in regard to the movement of the sticks out of the stick box feed grooves, is the manner in which the push rods are supported in the push bar and the relationship of the push rods to the feed grooves to permit a limited amount of self-alignment of the push rods relative to both the push bar and the feed grooves.

Another important feature, with respect to handling flat sticks, is the arrangement of the stick support frames providing clear guide channels for guiding the sticks directly and smoothly into the feed grooves, and providing individual weights acting on each stick stack to assure smooth and independent feed of the sticks from each stack into its respective feed groove. An ancillary feature is that the respective weights will assure that the last stick in the stack is fully received within the guide groove, and the weight will not interfere with the operation of the push rod for this cycle, or for subsequent cycles when the stick supply is depleted.

While preferred embodiments of the invention have been illustrated and described, it will be understood by those skilled in the art that changes and modifications may be resorted to without departing from the spirit and scope of the invention. While in the illustrated apparatus, the forces applied to project the sticks are applied and transmitted horizontally, it will be understood that the invention may be embodied in apparatus in which the same forces are applied and transmitted generally vertically. While the apparatus is described for use in the manufacture of "corny dogs", it will be understood it may be used for other purposes.

What is claimed is:

1. Apparatus for inserting elongated sticks into articles comprising
    an article holder having a plurality of chambers, each dimensioned to receive a single article; said chambers being disposed in side-by-side relation;
    a stick box including means defining a plurality of feed grooves at the base thereof, disposed in parallel side-by-side relation and in longitudinal alignment with respective article chambers, and means for supporting stacked sticks overlying each feed groove;
    a push rod assembly comprising a push bar and a plurality of elongated push rods, said push rods being supported by said push bar in parallel side-by-side relation and in alignment with respective feed grooves; means for reciprocating said push rod assembly to reciprocate said push rods in said feed grooves;
    said feed grooves each having a T-shaped cross-section including a bar portion and a stem portion; said push rods each having a T-shaped cross-section including a bar portion and a stem portion, said push rods being dimensionsed to be received in said feed grooves with a free sliding clearance fit;
    said push bar comprising the assembly of an elongated holder bar and clamp bar having contiguous faces; parallel holder grooves formed in at least one of said bars opening to its contiguous face; each holder groove having T-shaped cross-section, including a bar portion and a stem portion, and being dimensioned to fully receive a push rod with a clearance fit;
    said clamp bar being secured to said holder bar in overlying relation to enclose said holder grooves;
    said push bar having bearing means for engagement with the proximal ends of said push rods, and retaining means for retaining said push rods within said holder grooves.

2. Apparatus as set forth in claim 1
wherein the longitudinal center lines of said article chambers, of said feed grooves, and of said push rods, are disposed in a common plane.

3. Apparatus as set forth in claim 1
said means for supporting stacks of sticks comprising a plurality of stick guide frames; each guide frame including means defining confronting channels for confining the ends of the sticks of a stack.

4. Apparatus as set forth in claim 3
weight means guided in each of said guide frame channel means for urging a stack of sticks toward the respective guide groove, and configured to bridge said groove to prevent entry of said weight into the feed groove.

5. Apparatus as set forth in claim 3
said stick box comprising proximal front and rear support bars mounted on said base transverse to said feed grooves, and distal support bars supported above respective proximal support bars; said channel means comprising U-shaped channel members; and clamp means for securing the proximal and distal ends of said channel members to said proximal and distal support bars respectively, whereby the channels of said channel members are completely unobstructed.

6. Apparatus as set forth in claim 1
said stick box including a base plate having said feed grooves formed therein opening to one face; said T-shaped feed grooves including a bar portion opening to said one face and a dependent stem portion; and said bar portion being dimensioned to fully receive an elongated flat stick with a free sliding clearance fit.

7. Apparatus as set forth in claim 1
said stick box including a base plate having at least portions of said feed grooves formed therein and opening to one face, and a plurality of side-by-side dividers mounted on said base plate, defining stick guide channels overlying each base plate feed groove portion;
said T-shaped feed grooves including a bar portion formed in said base plate and a stem portion defined by spaced confronting lips of said dividers;
said spaced lips defining a stick feed groove; and said push rod stem portion projecting into said stick feed groove, whereby the end of said push rod will engage one end of a stick supported in said stick feed groove.

8. Apparatus as set forth in claim 1
said retaining means comprising retaining pins secured in said clamp bar and passing through clearance holes in said push rods, enabling said push rods to about said bearing means.

9. Apparatus as set forth in claim 8
said push bar having an elongated groove intersecting said push rod grooves; said bearing means comprising a bearing member received in said elongated groove defining a bearing wall for said push rods; and said retaining pins being dimensioned for a clearance fit in said push rod clearance holes enabling said push rods to abut said bearing bar.

10. Apparatus as set forth in claim 1
said push bar having an elongated groove intersecting said push rod grooves; said bearing means comprising a bearing member received in said elongated groove defining a bearing wall for said push rods.

11. Apparatus for inserting elongated sticks into articles comprising
an article holder having a plurality of chambers, each dimensioned to receive a single article; said chambers being disposed in side-by-side relation;
a stick box including means defining a plurality of feed grooves at the base thereof, disposed in parallel side-by-side relation and in longitudinal alignment with respective article chambers, and means for supporting stacked sticks overlying each feed groove;
a push rod assembly comprising a push bar and a plurality of elongated push rods, said push rods being supported by said push bar in parallel side-by-side relation and in alignment with respective feed grooves; means for reciprocating said push rod assembly to reciprocate said push rods in said feed grooves;
said feed grooves each having a T-shaped cross-section including a bar portion and a stem portion; said push rods each having a T-shaped cross-section including a bar portion and a stem portion, said push rods being dimensioned to be received in said feed grooves with a free sliding clearance fit;
including parallel guide shafts for supporting said push bar, said guide shafts being disposed in parallel relation to said push rods; and said push bar including linear ball bearings coacting with said guide shafts for guiding the reciprocating movement of said push rod assembly.

12. Apparatus as set forth in claim 11
said push rods being supported in said push bar with a clearance fit to enable self-guidance of said push rods through said feed grooves; and wherein the longitudinal center lines of said article chambers, of said feed grooves, of said push rods, and of said guide shafts are disposed in a common plane.

13. Apparatus as set forth in claim 11
said push bar comprising the assembly of a holder bar having parallel holder grooves for confining the rearward ends of said push rods, and an overlying clamp bar for enclosing said holder grooves.

14. Apparatus as set forth in claim 11
said means for reciprocating said push rod assembly comprising a pair of linear air cylinders; said linear air cylinders being mounted with their longitudinal center lines parallel with said push rods and said guide shafts, and disposed in a common plane with the center lines of said push rods and said guide shafts.

* * * * *